(12) United States Patent
Kang

(10) Patent No.: US 7,577,292 B2
(45) Date of Patent: Aug. 18, 2009

(54) AUTOMATIC REMOVAL OF PURPLE FRINGING FROM IMAGES

(75) Inventor: Sing Bing Kang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 659 days.

(21) Appl. No.: 11/322,736

(22) Filed: Dec. 30, 2005

(65) Prior Publication Data

US 2007/0153341 A1    Jul. 5, 2007

(51) Int. Cl.
  *G06K 9/00* (2006.01)
  *G06K 9/40* (2006.01)
  *G06K 9/36* (2006.01)
(52) U.S. Cl. .......................... 382/167; 382/254
(58) Field of Classification Search ........... 382/162, 382/164, 167, 218, 254, 272, 274, 275, 298, 382/260–264, 266, 268, 269; 358/1.9, 515, 358/518, 523, 525, 529, 530; 348/222.1, 348/241, 294; 345/589, 600–604
See application file for complete search history.

(56) References Cited

U.S. PATENT DOCUMENTS

| | | | | |
|---|---|---|---|---|
| 2006/0017855 A1* | 1/2006 | Yamada | ....................... | 348/650 |
| 2006/0098253 A1* | 5/2006 | Masuno et al. | ............... | 358/518 |
| 2006/0251322 A1* | 11/2006 | Palum et al. | ................ | 382/167 |
| 2007/0035641 A1* | 2/2007 | Yamada et al. | ............... | 348/241 |
| 2007/0153341 A1* | 7/2007 | Kang | ......................... | 358/529 |
| 2008/0170248 A1* | 7/2008 | Kang et al. | .................... | 358/1.9 |

FOREIGN PATENT DOCUMENTS

WO   WO-2005117454 A1   12/2005

OTHER PUBLICATIONS http://www.shaystephens.com/ca-ps.asp : Accessed on Nov. 9, 2005.
European Search Report, Application No. PCT/US2006/049125 completed Jun. 19, 2007, received Jun. 19, 2007.

\* cited by examiner

*Primary Examiner*—Amir Alavi
(74) *Attorney, Agent, or Firm*—Lyon & Harr, L.L.P.; Craig S. Fischer

(57) ABSTRACT

An automatic purple fringing removal system and method for automatically eliminating purple-fringed regions from high-resolution images. The technique is based on the observations that purple-fringing regions often are adjacent near-saturated regions, and that purple-fringed regions are regions in which the blue and red color intensities are substantially greater than the green color intensity. The automatic purple fringing removal system and method implements these two observations by automatically detecting a purple-fringed region in an image and then automatically correcting the region. Automatic detection is achieved by finding near-saturated regions and candidate regions, and then defining a purple-fringed region as a candidate region adjacent a near-saturated region. Automatic correction of a purple-fringed region is performed by replacing color pixels in the region with at least some fully monochrome pixels using a feathering process, a monochrome averaging process, or by setting the red and blue intensity values using the green intensity value.

17 Claims, 14 Drawing Sheets

AUTOMATIC REMOVAL OF PURPLE FRINGING FROM IMAGES

BACKGROUND

High-resolution still images are desirable because of the greater detail that is captured when compared to low-resolution still images. Fortunately, high-resolution cameras that are able to capture these high-resolution still images are becoming more accessible to the average consumer. With the advent of "prosumer" digital cameras, a user can buy a high-resolution camera containing several features once available only on more expensive professional cameras.

Unfortunately, however, many types of undesirable artifacts become more pronounced with high-resolution images. One of these artifacts is a phenomenon known as "purple fringing". Purple fringing exhibits itself as an out of focus purple ghost image rimming parts of the image. Although there is debate about the exact causes, it is known that the primary cause of purple fringing is chromatic aberration. Chromatic aberration is light dispersion by the lens. It occurs when different wavelengths of light focus at different spatial locations in the image, which results in a shift in colors. Purple fringing is more pronounced at sharp edges at object boundaries. Other secondary causes of purple fringing include blooming, demosaicing (for single CCD cameras), and anti-aliasing filters.

Several techniques are available that claim to eliminate purple fringing in high-resolution images. However, the majority of these techniques require manual intervention and input from a user. For example, typical purple fringing techniques require the user to manually indicate the purple-fringing region in the image. Moreover, these techniques require manual specification of the color that the user wants to replace the purple-fringed region. Thus, there is a dearth of automatic purple-fringing removal techniques.

One recent technique that comes closer to automatic purple-fringing removal is a plug-in for a popular image processing software application. However, one drawback with this current technique is that the purple-fringed regions in an image are not automatically detected. The user must indicate to the plug-in the location of purple-fringed regions before the regions are automatically corrected. Another disadvantage is that this technique merely replaces the purple-fringed regions by another color to tone down the purple-fringing effect. This causes problems if the purple-fringed region is near an object in the image having a true color that is near purple, because the original color is altered considerably. Yet another shortcoming is that there is no portion of the purple-fringed region that is replaced with an entirely monochromatic (or black-and-white) region. Thus, purple-fringing is not totally eliminated.

SUMMARY

The invention disclosed herein includes an automatic purple fringing removal system and method that automatically eliminates purple-fringed regions from high-resolution images. The technique is based on the first observation that purple-fringing regions tend to be adjacent extremely bright (or near-saturated) regions. Moreover, the technique is based on the second observation that purple fringing regions are regions in which the blue and red color intensities are substantially greater than the green color intensity. These observations are quite robust, and thus the automatic purple fringing removal technique based on these observations works extremely well for a large majority of images.

The automatic purple fringing removal system and method implements these two observations by first automatically detecting a purple-fringed region in an image and then automatically correcting the region. The purple-fringed region is corrected by replacing color pixels in the region with monochrome pixels to remove the purple fringing. Automatic detection is achieved by finding near-saturated regions and candidate regions, and then defining a purple-fringed region as a candidate region adjacent a near-saturated region. A near-saturated region is a region having pixels that are above a saturation threshold. A candidate region is a region having pixels where the blue and red intensity values of a pixel are substantially greater than the green intensity value.

Automatic correction of a purple-fringed region is performed using one of three embodiments. A first embodiment is a monochrome feathering process, whereby the pixels over the region are blended to make a gradual transition from full monochrome pixels to full color pixels. A second embodiment is a monochrome averaging process, which converts color pixels in a purple-fringed region to monochrome pixels. The monochrome pixels are computed using the average of the RGB values of the corresponding color pixels. This means that the new RGB values are all same. A third embodiment is a monochrome technique that sets the red and blue intensity values of a pixel in the purple-fringed region to the green intensity value. This results in a monochrome pixel wherein each RGB value has the intensity of the green intensity value.

DRAWINGS DESCRIPTION

Referring now to the drawings in which like reference numbers represent corresponding parts throughout:

DETAILED DESCRIPTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Image artifacts typically are more prominent in high-resolution images. One of the most common and disliked image artifacts is "purple fringing", which appears in some parts of the image as a purple haze around objects. Purple fringing occurs in both film and digital cameras. The majority of purple-fringing removal techniques are manual techniques that require a user to detect a purple-fringed region in the image. Moreover, many of these techniques replace the purple fringing pixels with pixels having another pre-specified color, such that the original color often is changed. In addition, the process of color replacement is typically abrupt at the region boundaries. Because of these two features, the resulting effect may not be visually pleasing.

The automatic purple-fringing removal system and method is a completely automated technique (requiring no manual user intervention) that both automatically detects and corrects purple fringing. The technique is based on the observations that purple fringing tends to be adjacent to saturated or near-saturated regions, and the regions in which purple fringing occurs are characterized by the red and blue intensity values of a pixel being much greater that the green intensity value. Based on these observations, the system and method detects purple-fringed regions containing purple fringing therein. Next, the colors pixels in the purple-fringed regions are replaced with monochrome pixels in order to completely eliminate the purple fringing. Alternatively, the purple fringed pixels may be replaced by colors originally observed, with much reduced amounts of purplish hue.

II. General Overview

Figure 1:
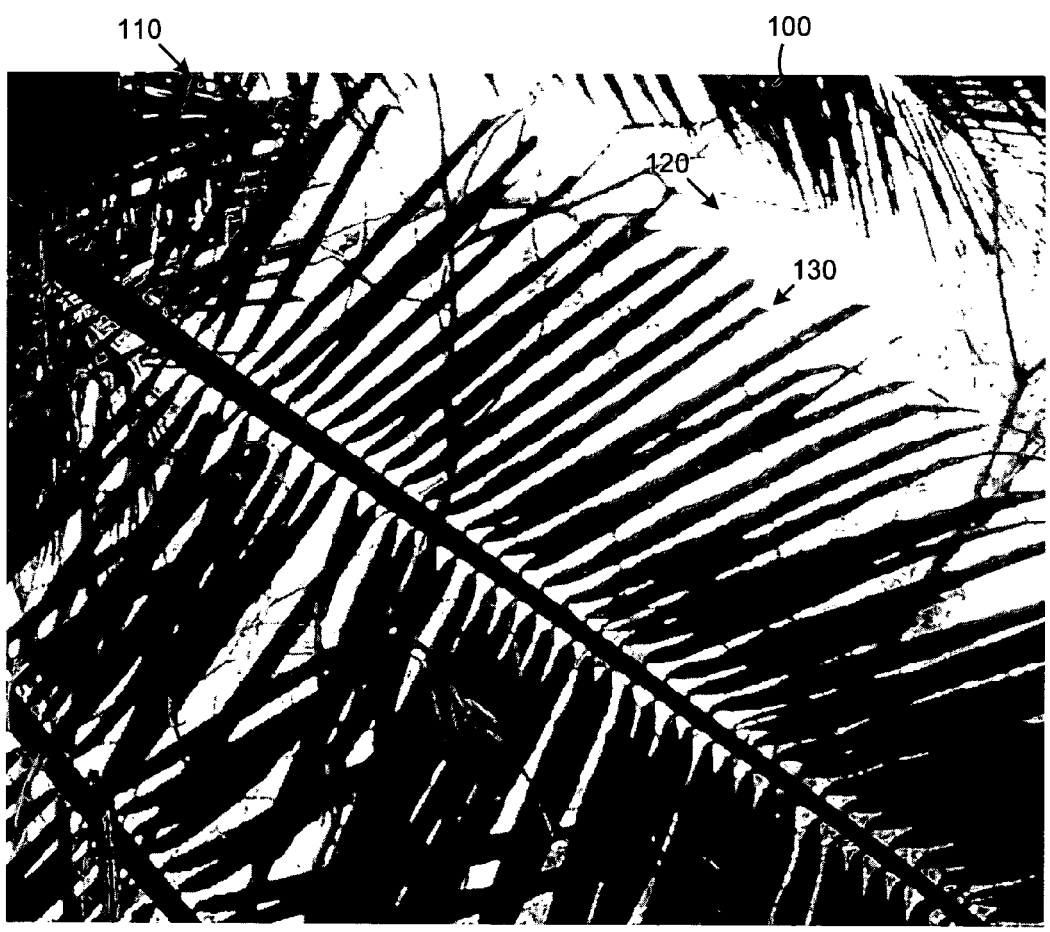
FIG. 1 illustrates the phenomenon of purple fringing.

FIG. 1 illustrates the phenomenon of purple fringing. As shown in FIG. 1, a high-resolution image 100 is contains an image of palm leaves 110 with a bright sky 120 in the background. Purple fringing can be seen as the purplish hue 130 around and in between the palm leaves 110. Not only does purple fringing diminish the aesthetic quality of the image 100, but it also masks the true color of that portion of the image.

Figure 2:
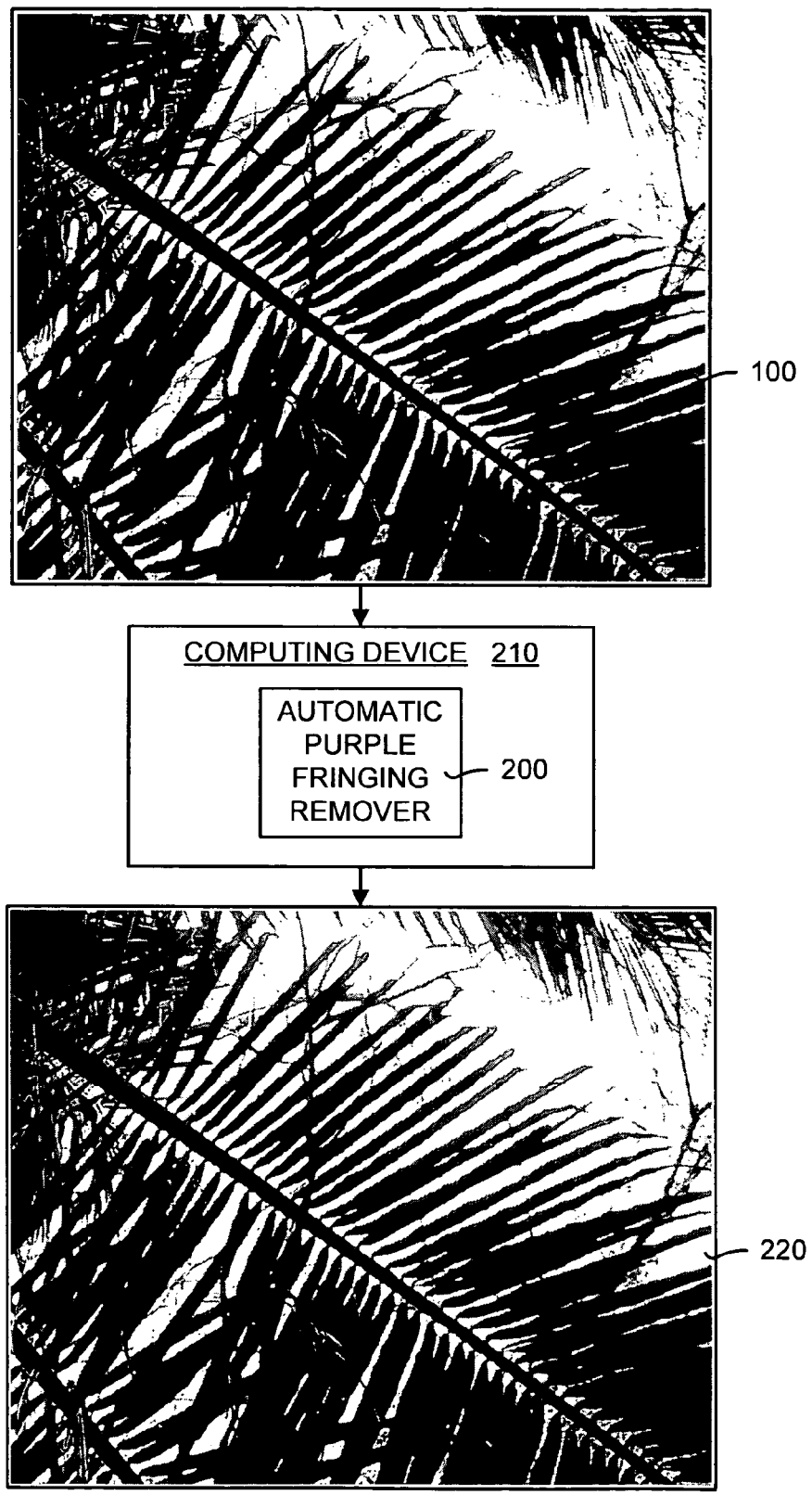
FIG. 2 is a block diagram illustrating an exemplary implementation of the automatic purple fringing remover disclosed herein.

FIG. 2 is a block diagram illustrating an exemplary implementation of the automatic purple fringing remover 200 disclosed herein. It should be noted that FIG. 2 is merely one of several ways in which the automatic purple fringing remover 200 may be implemented and used. As shown in FIG. 2, the automatic purple fringing remover 200 typically resides on a computing device 210. In this exemplary implementation the automatic purple fringing remover 200 is a stand-alone application that uses a single-button solution to remove purple fringing. A single-button solution has the user click a button and have the application automatically remove the purple fringing. If the user likes the automatic image processing, it is kept; otherwise, the processing can be undone.

In the exemplary implementation shown in FIG. 2, the input to the automatic purple fringing remover 200 is the high-resolution image 100 containing purple-fringing shown in FIG. 1. The image 100 is processed by the automatic purple fringing remover 200 in order to remove any purple-fringing. A corrected image 220 is output. The corrected image 220 has had the purple fringing removed by the automatic purple fringing remover 200.

III. Structural Overview

The structure of the automatic purple fringing remover 200 disclosed herein now will be discussed. In order to more fully understand the structure of the automatic purple fringing remover 200, the details of an exemplary embodiment are presented. However, it should be noted that this exemplary embodiment is only one of several ways in which the automatic purple fringing remover 200 may be implemented and used.

Figure 3:
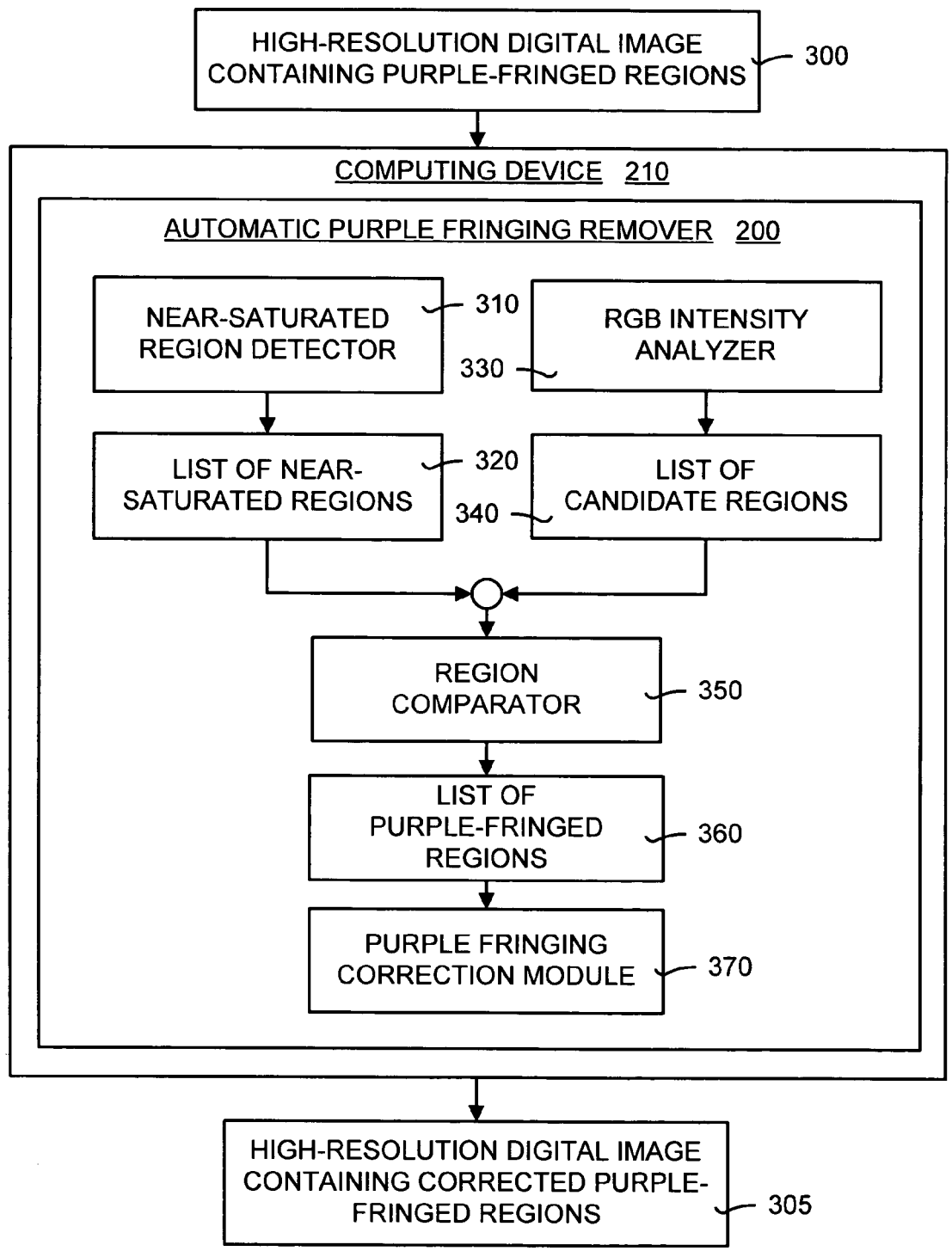
FIG. 3 is a general block diagram illustrating an overview of the components of automatic purple fringing remover shown in FIG. 2.

FIG. 3 is a general block diagram illustrating an overview of the components of automatic purple fringing remover 200 shown in FIG. 2. In general, the automatic purple fringing remover 200 processes an input image having purple fringing and outputs a processed image having the purple fringing removed. Specifically, input to the automatic purple fringing remover 200 is a high-resolution digital image containing purple-fringed regions 300 (the high-resolution image 100 is one example of this type of input). After processing, the output is a high-resolution digital image containing corrected purple-fringed regions 305.

The automatic purple fringing remover 200, which resides on the computing device 210, includes a near-saturated detector 310 that finds areas in the image 300 having pixels that are saturated or nearly saturated. The near-saturated detector provides a list of near-saturated regions 320. The automatic purple fringing remover 200 also includes an RGB analyzer 330 that determines intensity values for each pixel in the image 305. More particularly, the RGB analyzer 330 determines an intensity value for the red (R), green (G), and blue (B) colors of a pixel in the image 305. The RGB analyzer 330 provides a list of candidate regions 340.

The list of near-saturated regions 320 and the list of candidate regions 340 are input to a region comparator 350. The region comparator 350 analyzes the near-saturated and candidate regions and, based on this analysis (whose details are discussed below), generates a list of purple-fringed regions 360. A purple-fringing correction module 370 processes the purple-fringed regions 360 and, as explained in detail below, corrects and removes the purple fringing in the purpled-fringed regions 360. After processing, the output is the high-resolution digital image containing corrected purple-fringed regions 305.

IV. Exemplary Operating Environment

The automatic purple fringing remover 200 and the method used therein are designed to operate in a computing environment. The following discussion is intended to provide a brief, general description of a suitable computing environment in which the automatic purple fringing removal system and method may be implemented.

Figure 4:
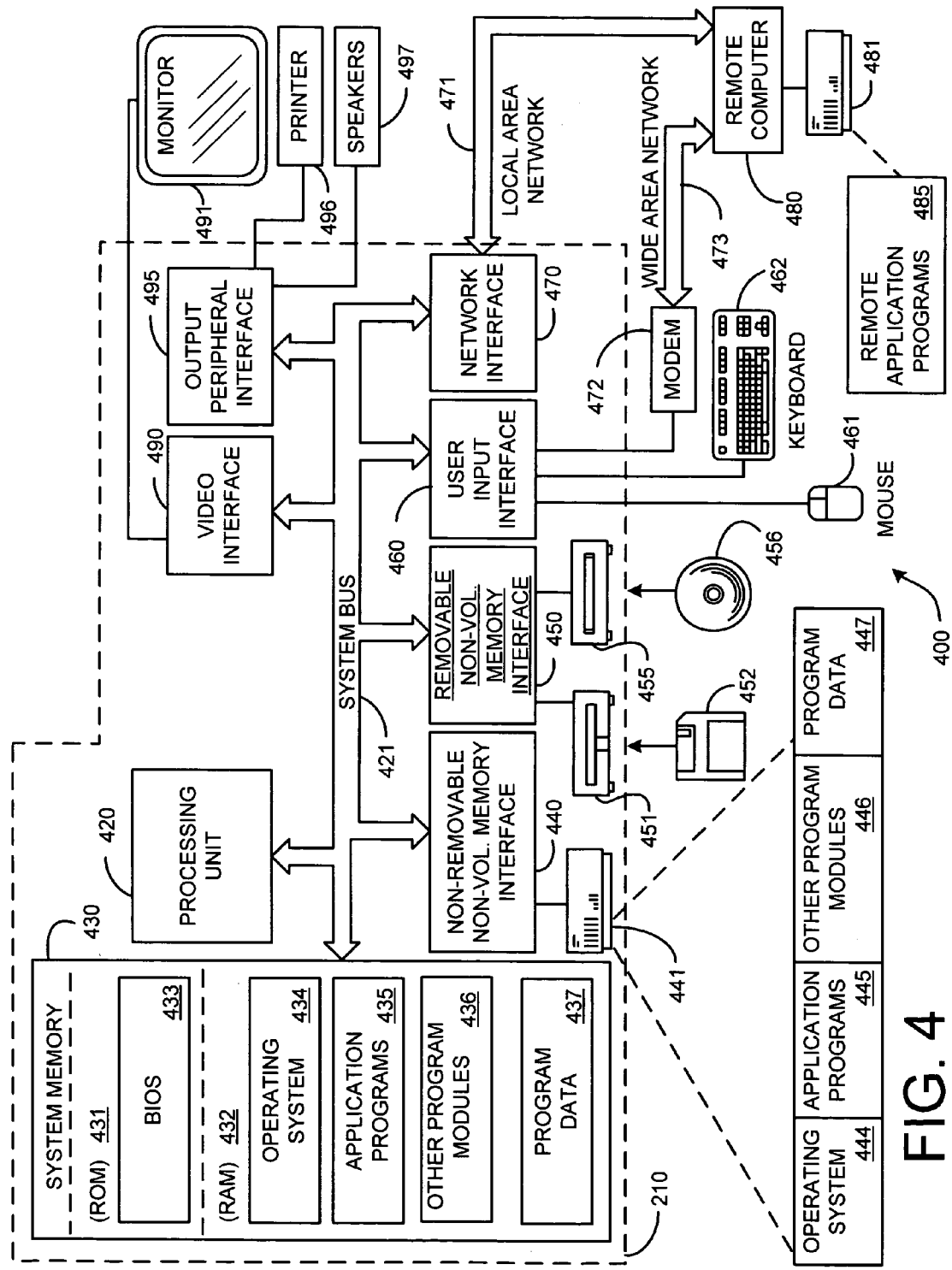
FIG. 4 illustrates an example of a suitable computing system environment in which the automatic purple fringing removal system and method shown in FIGS. 2 and 3 may be implemented.

FIG. 4 illustrates an example of a suitable computing system environment in which the automatic purple fringing removal system and method may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment.

The automatic purple fringing removal system and method is operational with numerous other general purpose or special purpose computing system environments or configurations. Examples of well known computing systems, environments, and/or configurations that may be suitable for use with the indirection texture magnification system and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The automatic purple fringing removal system and method may be described in the general context of computer-executable instructions, such as program modules, being executed by a computer. Generally, program modules include routines, programs, objects, components, data structures, etc., that perform particular tasks or implement particular abstract data types. The indirection texture magnification system and method may also be practiced in distributed computing environments where tasks are performed by remote processing devices that are linked through a communications network. In a distributed computing environment, program modules may be located in both local and remote computer storage media including memory storage devices. With reference to FIG. 4, an exemplary system for implementing the automatic purple fringing removal system and method includes a general-purpose computing device in the form of a computer 210.

Components of the computer 210 may include, but are not limited to, a processing unit 420 (such as a central processing unit, CPU), a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 210 typically includes a variety of computer readable media. Computer readable media can be any available media that can be accessed by the computer 210 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 210. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within the computer 210, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 210 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 210. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 210 through input devices such as a keyboard 462 and pointing device 461, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 420 through a user input interface 460 that is coupled to the system bus 421, but may be connected by other interface and bus structures, such as, for example, a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 210 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 210, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 210 is connected to the LAN 471 through a network interface or adapter 470. When used in a WAN networking environment, the computer 210 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 210, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

V. Operational Overview

Figure 5:
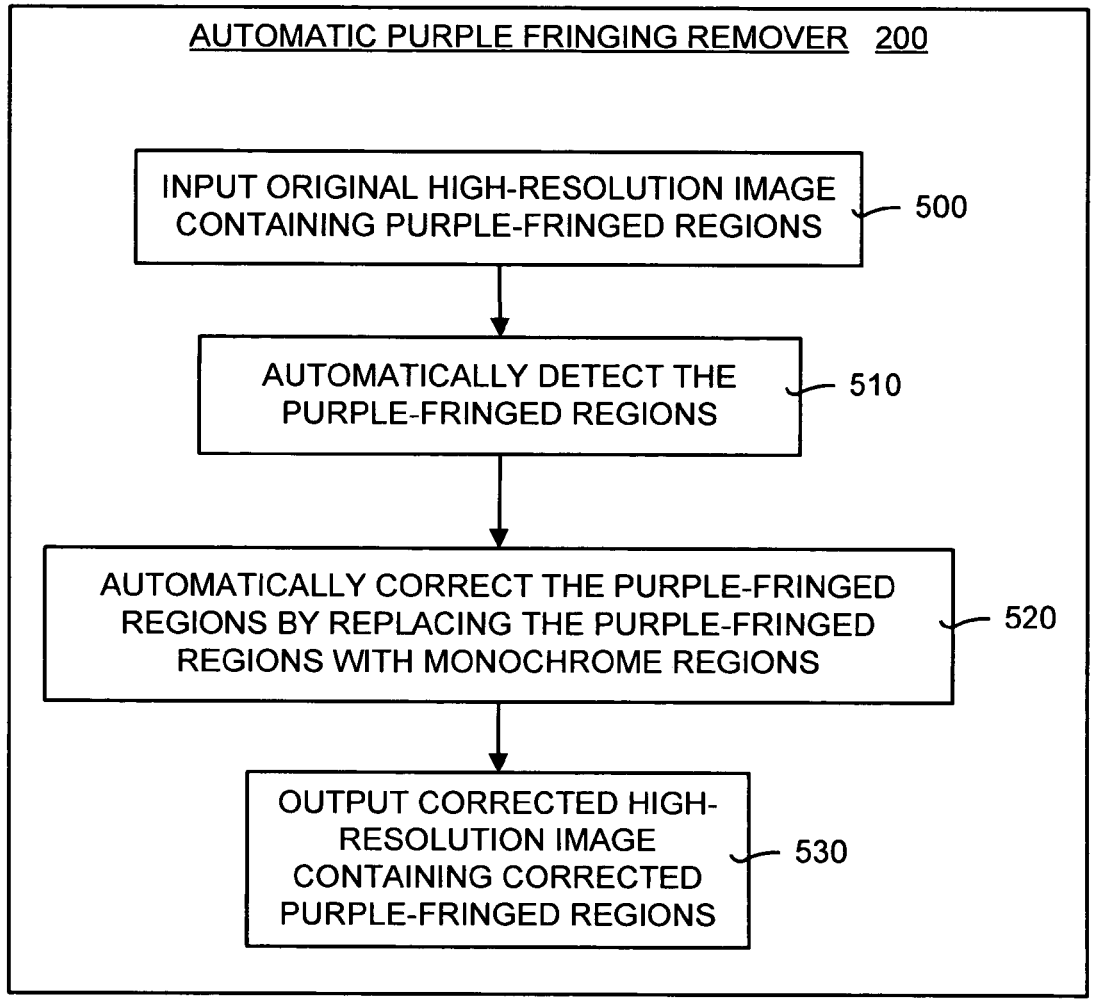
FIG. 5 is a general flow diagram illustrating the general operation of the automatic purple fringing remover shown in FIGS. 2 and 3.

FIG. 5 is a general flow diagram illustrating the general operation of the automatic purple fringing remover 200 shown in FIGS. 2 and 3. As shown in FIG. 5, the automatic purple fringing removal method begins by receiving as input an original high-resolution image containing purple-fringed regions (box 500). The purple-fringed regions contain purple fringing. Next, the purple-fringed regions within the image are automatically detected (box 510). After detection, the purple-fringed regions are automatically corrected (box 520). This correction occurs by replacing the purple-fringed regions with monochrome or purple-reduced regions. The output is a corrected high-resolution image containing corrected purple-fringed regions (box 530).

VI. Operational Details, Working Example, and Results

The automatic purple fringing removal method shown in FIG. 5 is based on two observations. First, the observation that the purple-fringed regions tend to be adjacent extremely bright (or near-saturated) regions. Second, the observation that a pixel in a purple-fringed region contains blue and red color intensity values that are substantially greater than the green color intensity value. In the typically case, the blue intensity value (B) is greater than the red intensity value (R), which are both much greater than the green intensity value (G) (or blue (B)>red (R)>green (G)). These observations are quite robust, and consequently the automatic purple fringing removal method works for the majority of images containing purple fringing.

The color rise of the red and blue color intensities also gives rise to a loss of original color. This makes it quite difficult to determine what the original colors of an image. The automatic purple fringing removal method tones down the red and blue intensity values and changes the pixel in the purple-fringed region from color to monochromatic. The method also can reduce the amount of purple to generate what the method determines is closer to the original color if the amount of purple fringing is not too significant.

Figure 6:
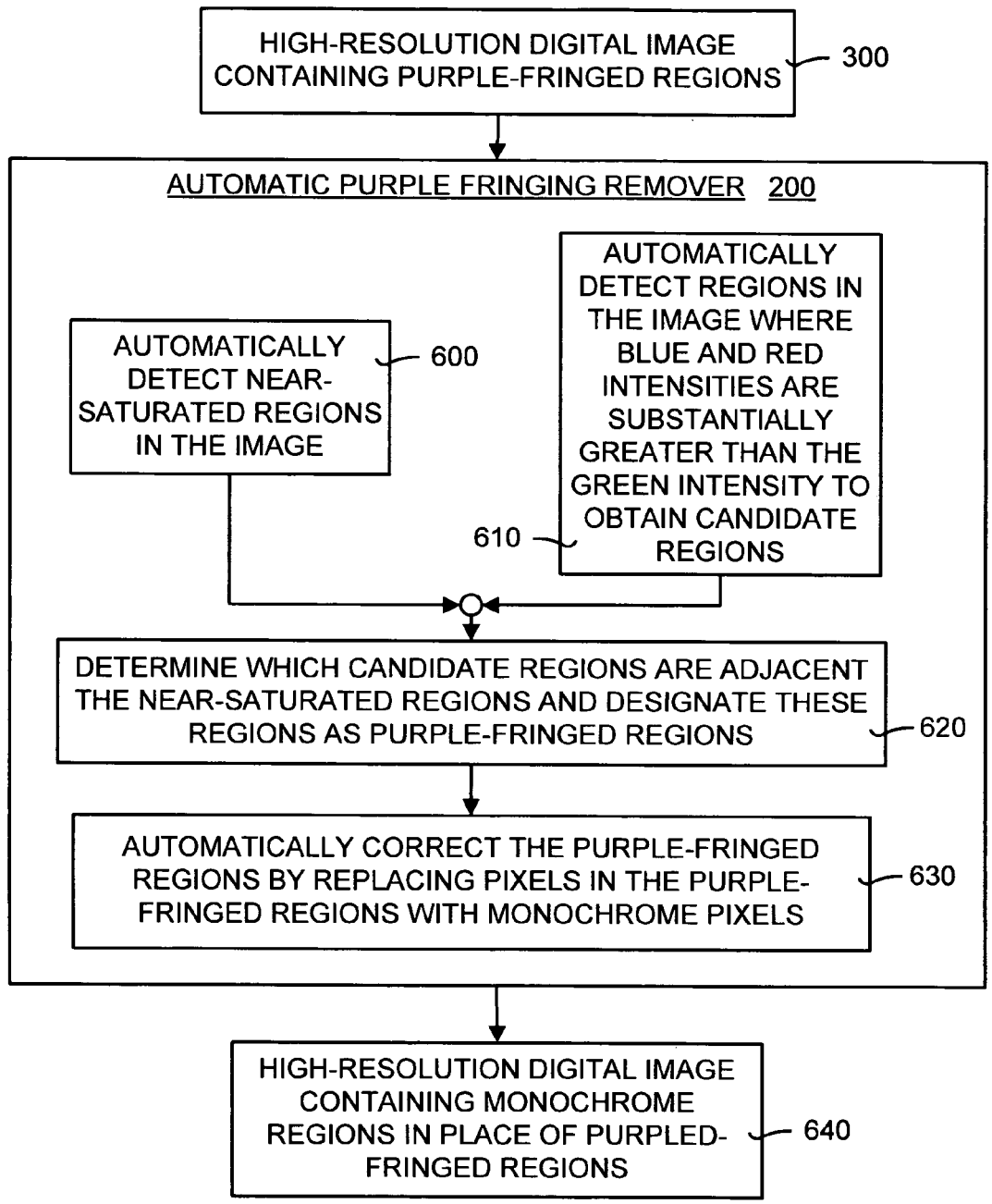
FIG. 6 is a flow diagram illustrating details of the automatic purple fringing removal method shown in FIG. 5.

FIG. 6 is a flow diagram illustrating details of the automatic purple fringing removal method shown in FIG. 5. The process begins by inputting the high-resolution digital image 300 containing purple-fringed regions. Near-saturated regions in the image 300 are automatically detected (box 600). In addition, regions in the image 300 where blue and red intensity values of a pixel are substantially greater than the green intensity value are automatically detected (box 610). These regions are called candidate regions.

The method then determines which candidate regions are adjacent to the near-saturated regions and designates these regions as purple-fringed regions (box 620). In this manner, the purple-fringed regions in the image 300 are automatically detected. Once detected, the purple-fringed regions are automatically corrected by replacing pixels in the purple-fringed regions with monochrome (or black and white) pixels (box 630). Alternatively, the replaced color can be one in which the amount of purple is substantially reduced. The output is a high-resolution digital image containing monochrome regions in place of purple-fringed regions 305.

One advantage of the automatic purple fringing removal method is that is does not blindly correct regions where the original color of the image is really purple. If a region is purple and is not close to any saturated regions, then the region is not corrected. Another advantage is that the purple-fringed region contains at least some fully monochromatic pixels, which is significantly less visually objectionable. This means that the purple-fringing is completely eliminated, unlike some removal techniques that merely replace a purple pixel with another pre-specified color.

Working Example

The details of an exemplary working example of the automatic purple fringing removal system and method now will be discussed. It should be noted that this working example is only one of several ways in which the automatic purple fringing removal system and method may be implemented.

Near-Saturated Region

The determination as to whether a pixel is saturated was made by comparing a pixel's intensity value to a saturation threshold. If the intensity value was greater than or equal to the saturation threshold, then the pixel was considered a near-saturated pixel. When a digital picture is taken, a pixel color is made up of three colors red (R), green (G), and blue (B). These colors are discretized from level 0 (which is black) to level 255 (which is the brightest level). Thus, level 255 is entirely saturated. In the working example, a pixel was designated as a near-saturated pixel if an intensity value (or RGB value) was greater than or equal to 230 (the near-saturation threshold). Alternatively, any saturation threshold value that is reasonably high can be used.

Candidate Region

In order to determine regions that were candidate regions (or potential purple-fringed regions), the working example required that both the following conditions be met:

(blue color intensity($B$))−(red color intensity($R$))>25;   1.

and;

(blue color intensity($B$))−(green color intensity($G$)) >25.   2.

If both these conditions are met, then the region was designated as a candidate region. Moreover, as explained above, if a candidate region was adjacent to a near-saturated region, then the candidate region was upgraded to a purple-fringed region in the image.

Size Limitation of Purple-Fringed Regions

If a candidate region is large and is adjacent a near-saturated region, it does not necessarily follow that the entire candidate region is purple-fringed. In the working example, a limitation was place on the size of the purple-fringed region.

Figure 7:
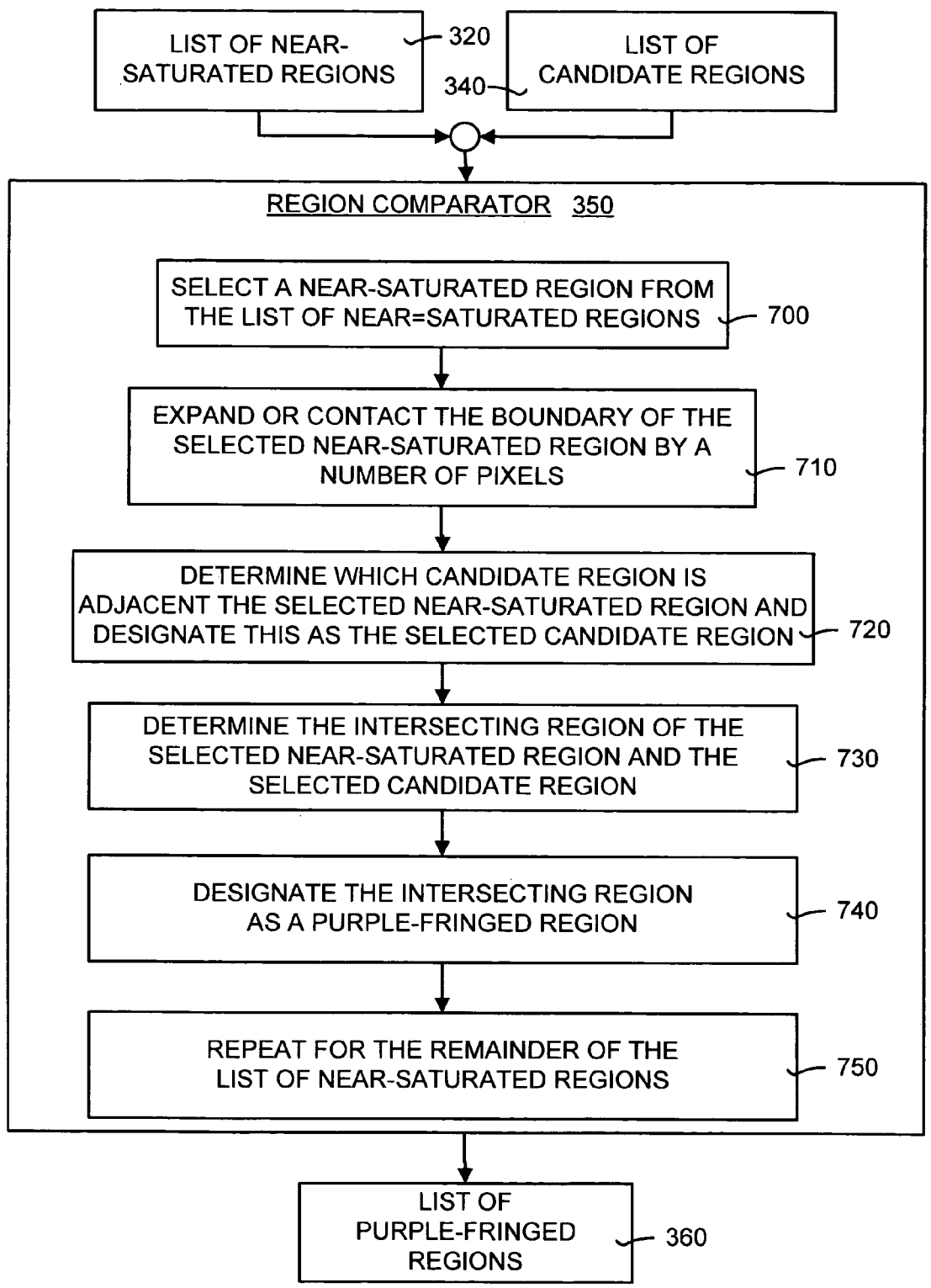
FIG. 7 is a block/flow diagram illustrating the limiting of the purple-fringed region size.

FIG. 7 is a block/flow diagram illustrating the limiting of the purple-fringed region size. The process was performed by the region comparator 350, shown in FIG. 3. Input to the regions comparator 350 was the list of near-saturated regions 320 and the list of candidate regions 340. The purple-fringed region size limitation process begins by selecting a near-saturated region from the list of near-saturated regions (box 700). Next, a boundary of the selected near-saturated region was expanded or contracted by a certain number of pixels (box 710). It was then determined which candidate region was adjacent the selected near-saturated region and this region was designated as the selected candidate region (box 720).

An intersection region then was defined, which was the region formed by the intersection of the selected near-saturated region and the selected candidate region (box 730). This intersection region was designated as a purple-fringed region (box 740). This intersection region is the part that is considered the color-fringed region and is converted to monochrome or purple-reduced color. The process then was repeated for each of the remaining near-saturated regions on the list of near-saturated regions (box 750). The output was the list of purple-fringed regions 360.

First Embodiment of Purple Fringing Correction

The first of three embodiment of the purple fringing correction module 370 shown in FIG. 3 will now be presented. The first embodiment is a monochrome feathering technique that feathers or blends pixels in the purple-fringed region such that there is a gradual transition from color pixels to monochromatic (or black-and-white) pixels.

Feathering is used because the result of abruptly changing one color to another in a color image is not pleasing to a viewer. In fact, it looks odd to a viewer. Feathering, which gradually transitions from color to another (possibly monochrome), avoids this problem.

Figure 8:
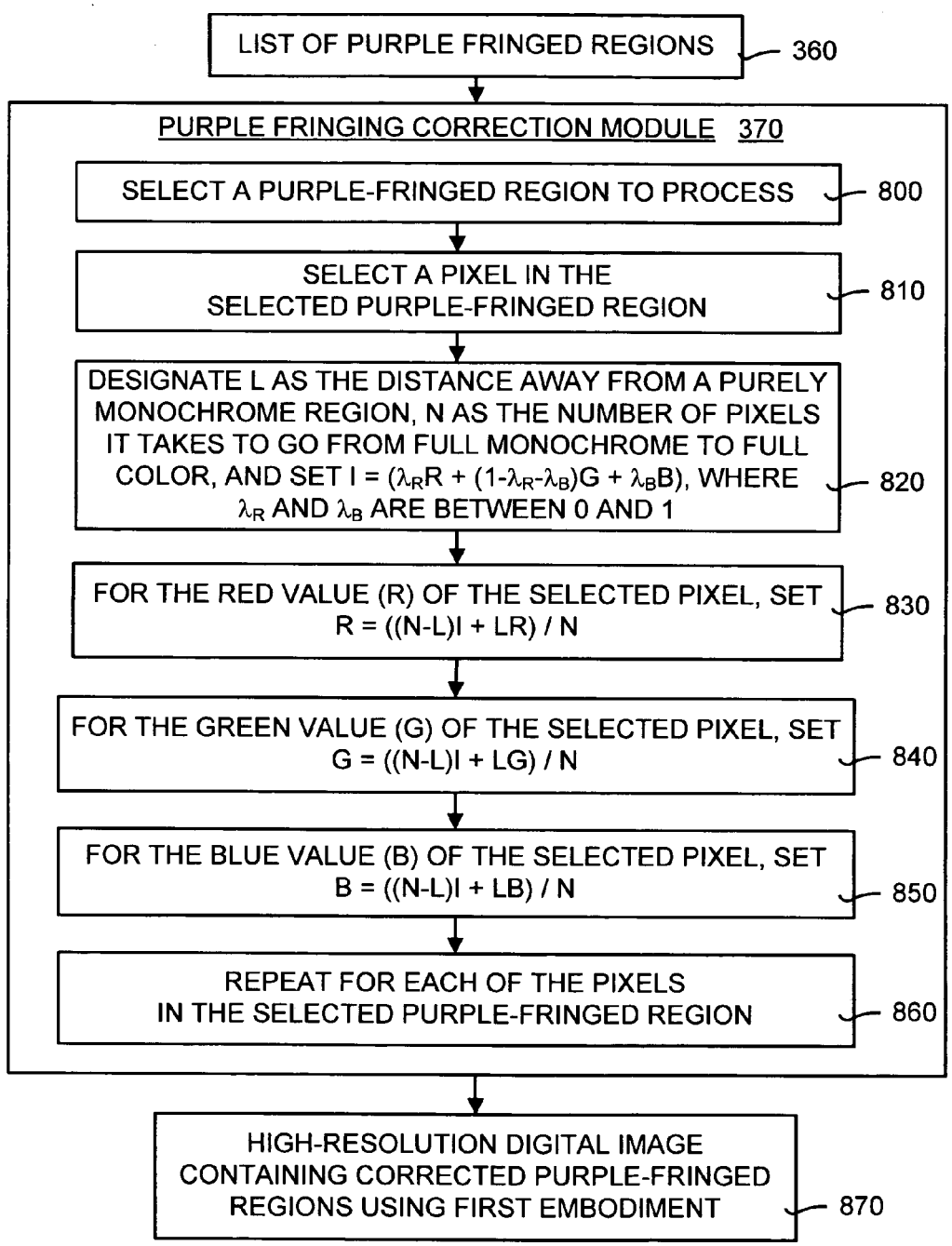
FIG. 8 is a flow diagram illustrating a first embodiment of the purple-fringing correction module shown in FIG. 3.

The feathering process grows one pixel at a time. At each step the average pixel value is blended with its original value. FIG. 8 is a flow diagram illustrating a first embodiment of the purple-fringing correction module 370 shown in FIG. 3. The input to the purple fringing module 370 is the list of purple-fringed regions 360. This first embodiment begins by selecting a purple-fringed region to process (box 800). A pixel then is selected that is in the selected purple-fringed region (box 810). Next, L is designated as the distance away from a purely monochrome region, N is the number of pixels it takes to go from fully monochrome to fully color, and the weighted average intensity, I, is given by the equation:

$$I=(\lambda_R R+(1-\lambda_R-\lambda_B)G+\lambda_B B),$$

where $\lambda_R$ and $\lambda_B$ are numbers between 0 and 1 (box 820). In the case where $\lambda_R=\lambda_B=\frac{1}{3}$, it is just direct averaging. However, in the limit, the green channel can be selected to rely on only by setting $\lambda_R=\lambda_B=0$, since purple fringing exaggerates the values of R and B. In one embodiment, $\lambda_R=\lambda_B=0$ was used.

The red intensity value of the selected pixel (box 830) is given by:

$$R=((N-L)I+LR)/N,$$

the green intensity value of the selected pixel (box 840) is given by:

$$G=((N-L)I+LG)/N,$$

and the blue intensity value of the selected pixel (box 850) is given by:

$$B=((N-L)I+LB)/N.$$

In the working example, N=10 pixels, where N varied from 0 to 10.

Note that when L=0, then R=I, in other words, it is exactly equal to the monochrome value. The feathering effectuates a linear change between pure color and pure monochrome. Pure monochrome pixels are in the purple-fringed region, while pure color pixels are in the saturated region. The above process is repeated for each of the pixels in the selected purple-fringed region (box 860). The output is a high-resolution digital image containing corrected purple-fringed regions using the first embodiment (box 870).

Second Embodiment of Purple Fringing Correction

The second embodiment of the purple fringing correction module 370 shown in FIG. 3 will now be presented. The second embodiment is a monochrome averaging technique that converts a purple-fringed region to a monochrome (or black and white) region. In particular, the new RGB values are the average of the old RGB values. This means that the new RGB values are all same. This process causes the color to turn into black and white. What is lacking in this technique is the feather process of the first embodiment, such that there is no gradual transition from color pixels to monochromatic pixels.

Figure 9:
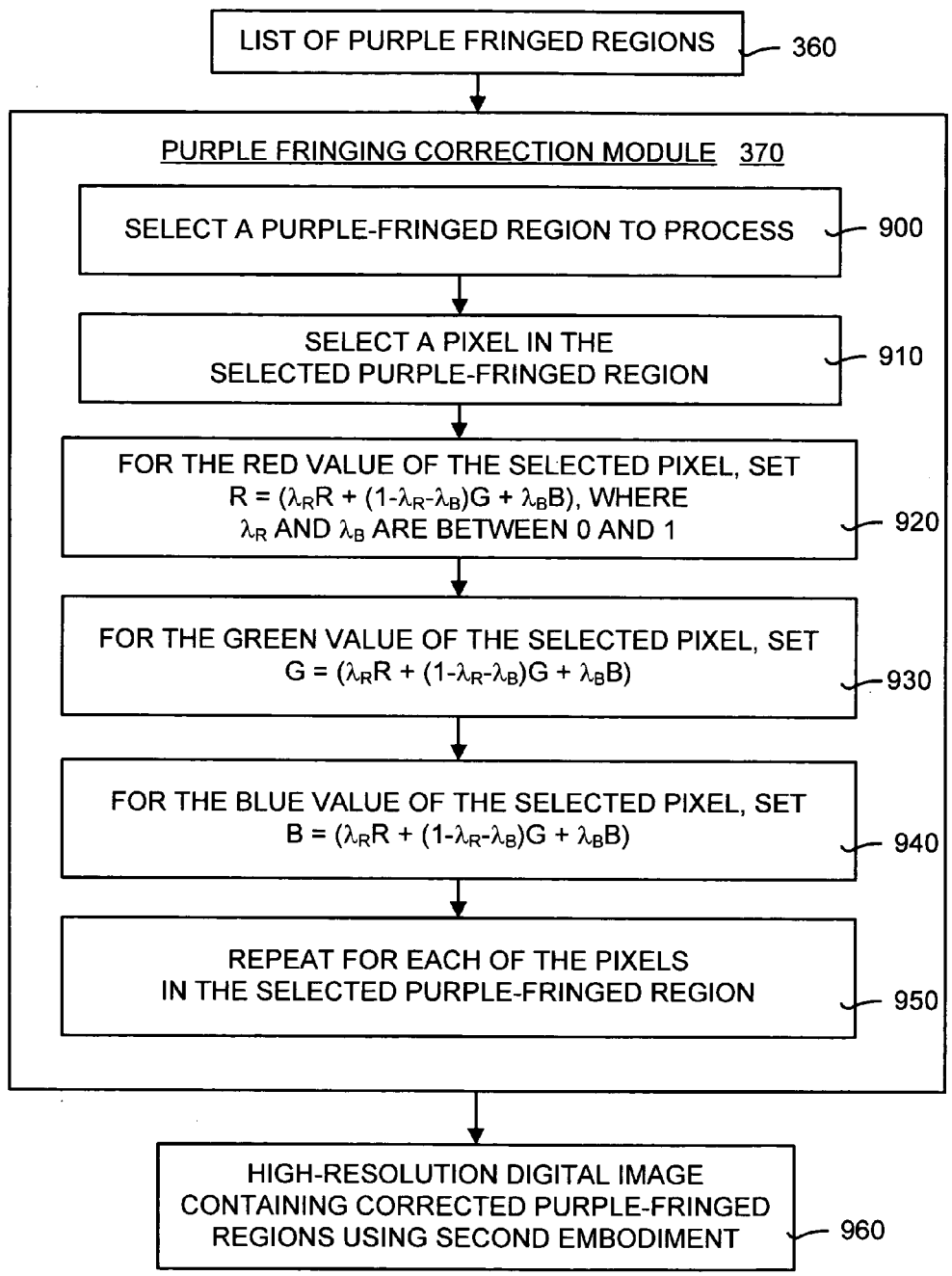
FIG. 9 is a flow diagram illustrating a second embodiment of the purple-fringing correction module shown in FIG. 3.

FIG. 9 is a flow diagram illustrating a second embodiment of the purple-fringing correction module 370 shown in FIG. 3. The input to the purple fringing module 370 is the list of purple-fringed regions 360. This second embodiment begins by selecting a purple-fringed region to process (box 900). A pixel from the selected purple-fringed region then is selected (box 910).

The red intensity value of the selected pixel (box 920) is given by:

$$R=(\lambda_R R+(1-\lambda_R-\lambda_B)G+\lambda_B B),$$

the green intensity value of the selected pixel (box 930) is given by:

$$G=(\lambda_R R+(1-\lambda_R-\lambda_B)G+\lambda_B B),$$

and the blue intensity value of the selected pixel (box 940) is given by:

$$B=(\lambda_R R+(1-\lambda_R-\lambda_B)G+\lambda_B B),$$

Again, $\lambda_R$ and $\lambda_B$ are numbers between 0 and 1, and preferably are small, since the R and B values are less reliable (being artificially bloated by the process of purple fringing).

This process is repeated for each of the pixels in the selected purple-fringed region (box 950). The output is a high-resolution digital image containing corrected purple-fringed regions using the second embodiment (box 960).

Third Embodiment of Purple Fringing Correction

The third embodiment of the purple fringing correction module 370 shown in FIG. 3 will now be presented. The third embodiment is a technique that sets the red and blue intensity values using the green intensity value. This is done because green is the most trustworthy color. What is lacking in this technique is the feather process of the first embodiment, such that there is no gradual transition. However, this embodiment easily can be adapted to include feathering. Moreover, in most situations the monochrome averaging process of the second embodiment looks better, since it retains the intensity.

Figure 10:
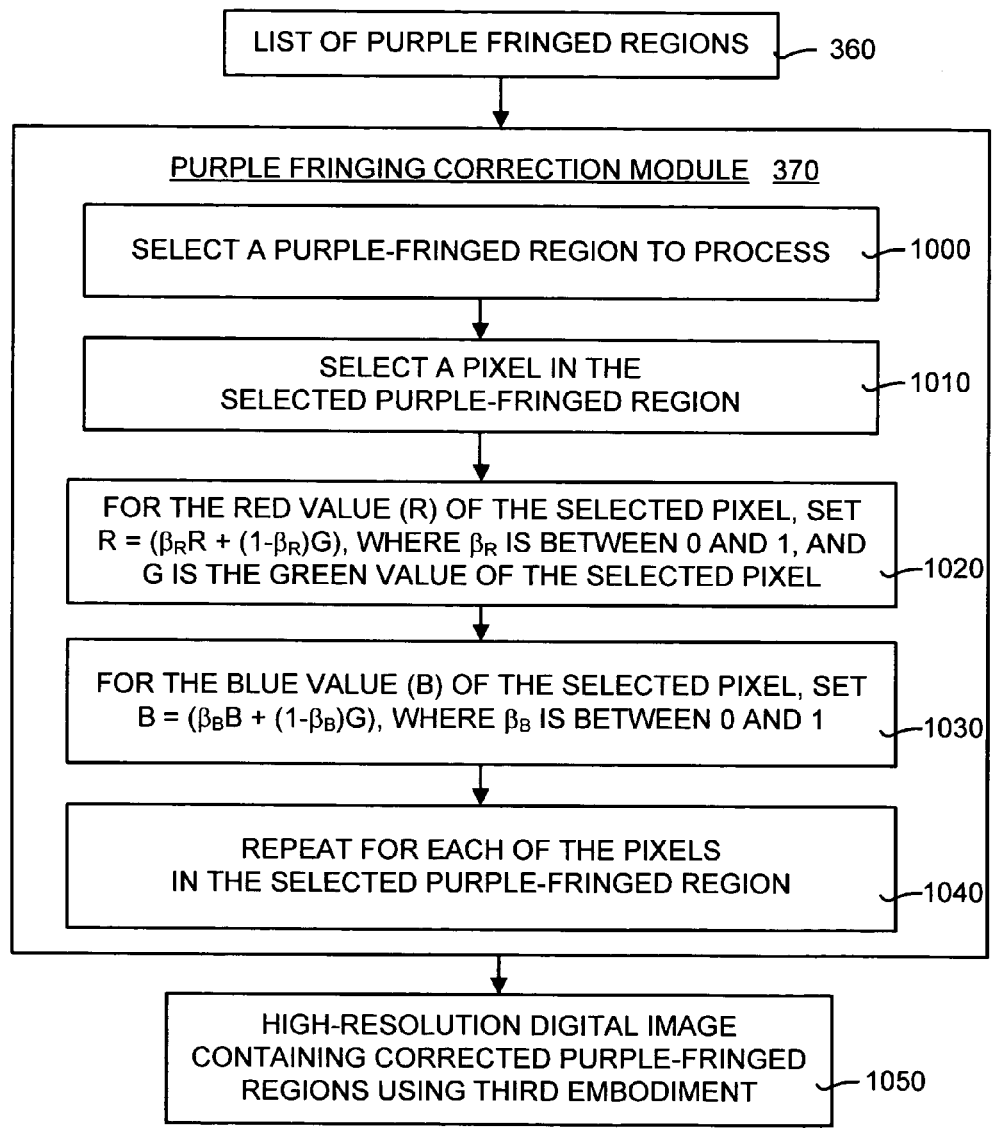
FIG. 10 is a flow diagram illustrating a third embodiment of the purple-fringing correction module shown in FIG. 3.

FIG. 10 is a flow diagram illustrating a third embodiment of the purple-fringing correction module 370 shown in FIG. 3. The input to the purple fringing module 370 is the list of purple-fringed regions 360. This third embodiment begins by selecting a purple-fringed region to process (box 1000). A pixel from the selected purple-fringed region then is selected (box 1010).

The red intensity value of the selected pixel (box 1020) is given by:

$$R = \beta_R R + (1 - \beta_R) G$$

and the blue intensity value of the selected pixel (box 1030) is given by:

$$B = \beta_B B + (1 - \beta_B) G.$$

Both $\beta_R$ and $\beta_B$ are numbers between 0 and 1, and are should be set to a small number, since G is the most trustworthy value. By setting $\beta_R$ and $\beta_B$ to small non-zero values, we are essentially carrying over some residual original color if the amount of purple fringing is not too overwhelming. The original green intensity value of the selected pixel is retained if both $\beta_R$ and $\beta_B$ are set to 0.

The above process is repeated for each of the pixels in the selected purple-fringed region (box 1040). The output is a high-resolution digital image containing corrected purple-fringed regions using the third embodiment (box 1050).

Results

The results obtained from the automatic purple fringing removal system and method now will be presented. Specifically, two sets of results will be presented, so that it can be seen how effective the automatic purple fringing removal system and method is at removing purple fringing from images.

Figure 11:
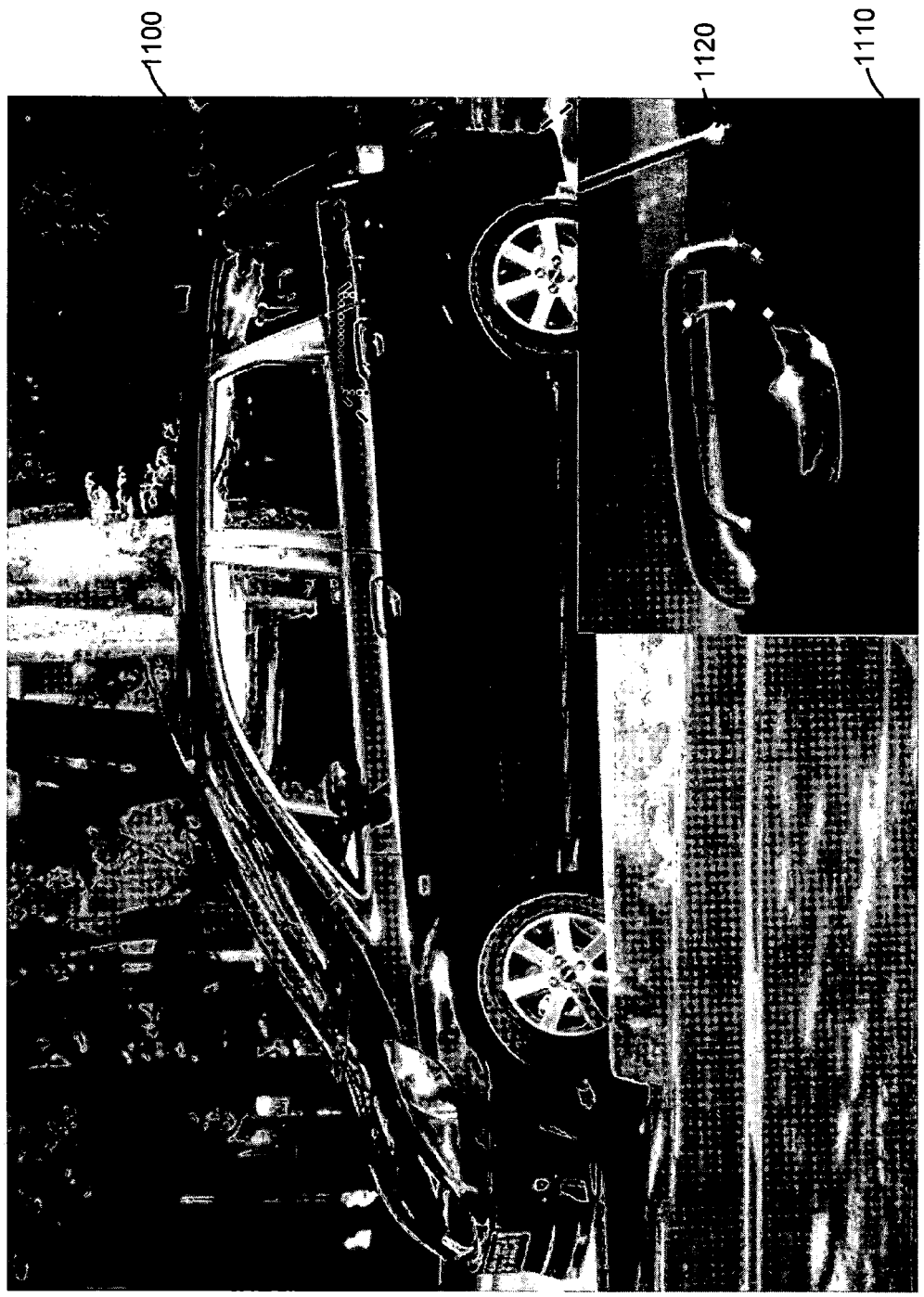
FIG. 11 is a first image containing purple fringing before processing by the automatic purple fringing removal system and method.

FIG. 11 is a first image 1100 containing purple fringing before processing by the automatic purple fringing removal system and method. An inset image 1110 shows one area 1120 of pronounced purple fringing. FIG. 12A is a second image 1200 that is a portion of the first image 1100, showing in closer details the purple fringing on the car.

Figure 12B:
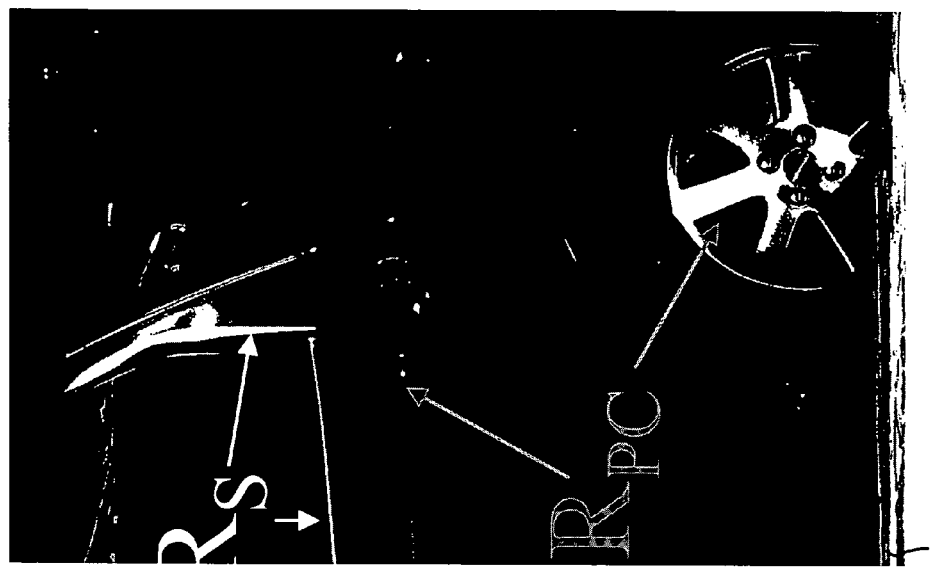
FIG. 12B illustrate an analysis of the second image shown in FIG. 12A.
Figure 12A:
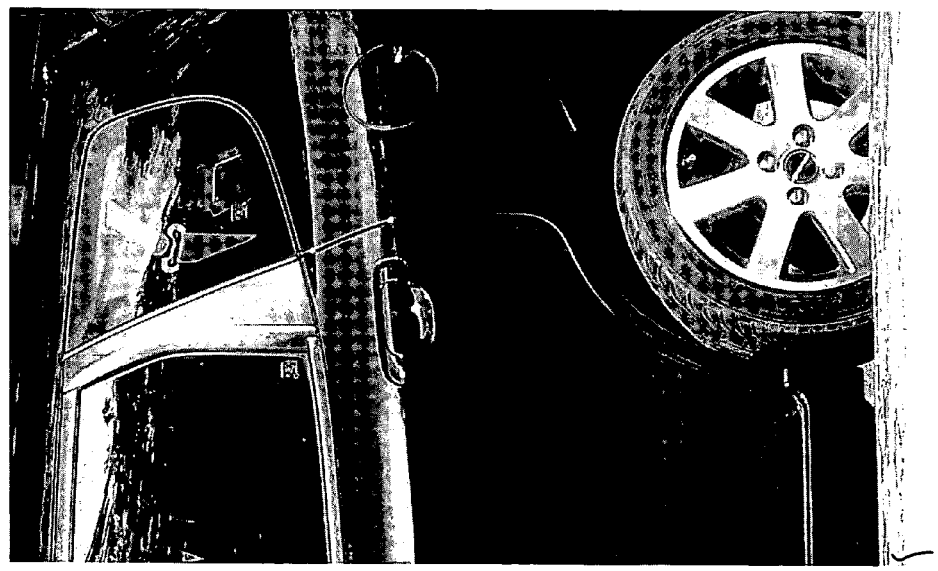
FIG. 12A is a second image that is a portion of the first image, showing in closer details the purple fringing on the car.

FIG. 12B illustrate an analysis of the second image 1200 shown in FIG. 12A. Specifically, the third image 1210 illustrates the second image 1200 after partial processing by the automatic purple fringing removal system and method. $R_S$ represents the near-saturated regions in the second image 1200, and $R_{PC}$ represents the purple-fringed regions.

Figure 13:
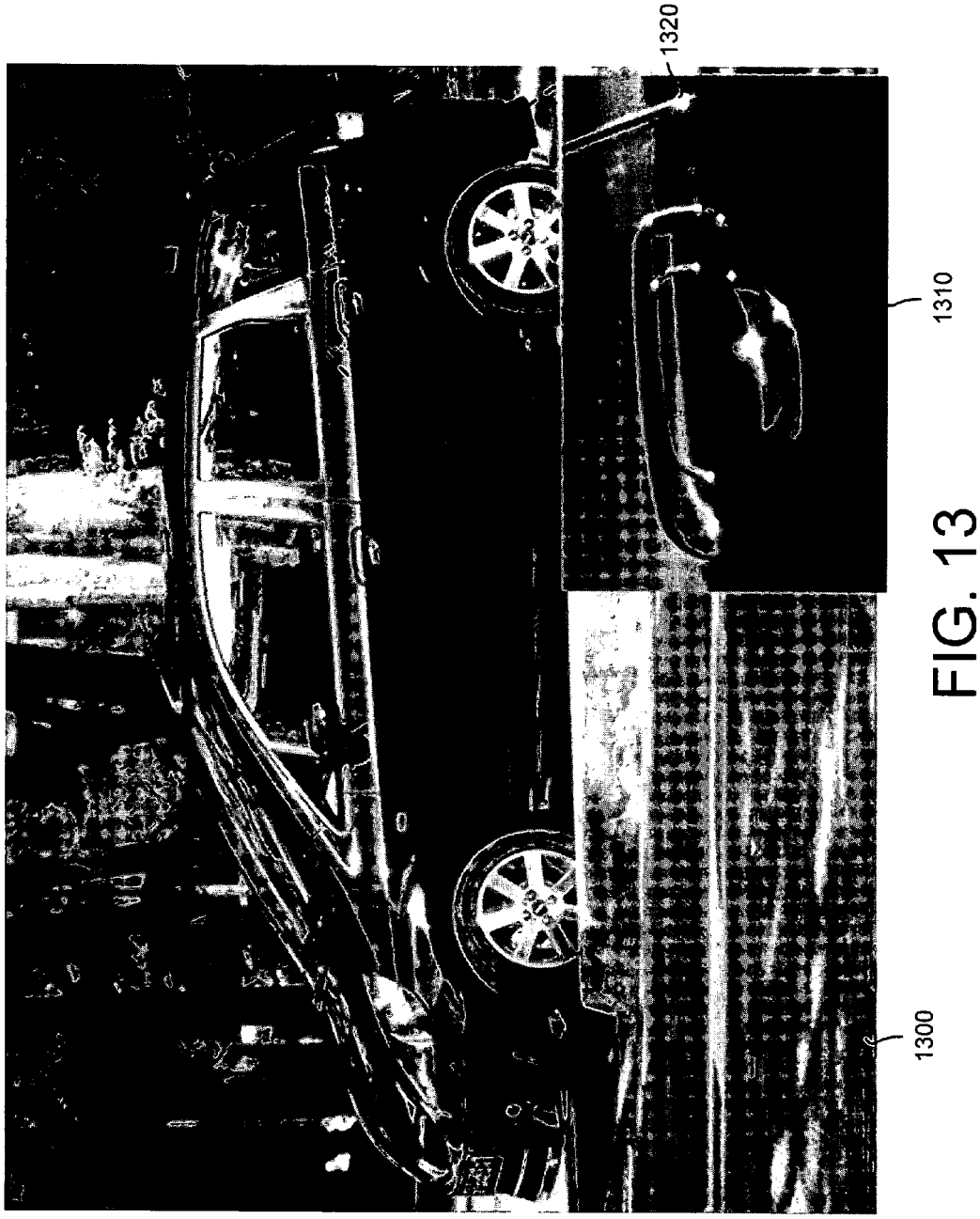
FIG. 13 is a fourth image that illustrates the result of processing the first image shown in FIG. 11 by the automatic purple fringing removal system and method.

FIG. 13 is a fourth image 1300 that illustrates the result of processing the first image 1100 shown in FIG. 11 by the automatic purple fringing removal system and method. As can be seen in the inset image 1310 of the fourth image 1300, one area of pronounce purple fringing 1120 has been completely removed, as shown by corrected area 1320. It should be noted that the fourth image 1300 is much more pleasingly to a user when compared to the first image 1100.

Figure 14:
FIG. 14 illustrates the result of processing the high-resolution image shown in FIG. 1 by the automatic purple fringing removal system and method.

FIG. 14 illustrates the result of processing the high-resolution image 100 shown in FIG. 1 by the automatic purple fringing removal system and method. The processed result of the high-resolution image 100 is a fifth image 1400. It should be noted that this fifth image 1400 the purple fringing visible in the original image 100 is removed 1410 in the fifth image 1400. The removal of the purple fringing makes the image 1400 much easier on a viewer's eyes.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A computer-implemented method for removing purple fringing contained in an image, comprising:
   using the computer to perform the following:
      automatically correcting the purple fringing by replacing color pixels in the purple-fringed region with at least some purely monochrome pixels to feather pixels in the purple-fringed region such that there is a gradual transition from purely monochrome pixels at an interior of the purple-fringed region to a fully color pixels at a boundary of the purple-fringed region to remove the purple fringing.

2. The computer-implemented method of claim 1, wherein automatically detecting the purple-fringed region further comprises detecting a near-saturated region in the image, wherein the near-saturated region contains pixels having an intensity value greater than a saturation threshold, and wherein a fully saturated pixel has an intensity value of 255.

3. The computer-implemented method of claim 2, wherein the saturation threshold is greater than or equal to 230.

4. The computer-implemented method of claim 2, wherein automatically detecting the purple-fringed region further comprises detecting a candidate region, wherein each pixel in the candidate region has red and blue intensity values that are substantially greater than a green intensity value.

5. The computer-implemented method of claim 4, further comprising determining that a pixel has red and blue intensity values that are substantially greater than a green intensity value if both these two conditions are met:

(blue intensity value−red intensity value)>25; (a)

and (blue intensity value−green intensity value)>25 (a).

6. The computer-implemented method of claim 4, further comprising:
   determining that the candidate region is adjacent the near-saturated region; and
   designating the candidate region adjacent the near-saturated region as the purple-fringed region.

7. The computer-implemented method of claim 1, further comprising:

defining a weighted average intensity, I, as:

$$I=(\lambda_R R+(1-\lambda_R-\lambda_B)G+\lambda_B B);$$

selecting a feathered pixel in the purple-fringed region;
setting a red intensity value (R) of the feathered pixel ($R_{Feathered}$) as:

$$R_{Feathered}=((N-L)I+LR)/N;$$

selling a green intensity value (G) of the feathered pixel ($G_{Feathered}$) as:

$$G_{Feathered}=((N-L)I+LG)/N; \text{ and}$$

setting a blue intensity value (B) of the feathered pixel as ($B_{Feathered}$)

$$B_{Feathered}=((N-L)I+LB)/N;$$

where L is a distance away from a fully monochrome pixel, N is a number of pixels over which it takes to go from a fully monochrome pixel to a fully color pixel, and $\lambda_R$ and $\lambda_B$ are numbers between 0 and 1.

8. The computer-implemented method of claim 1, wherein automatically correcting the purple fringing further comprises replacing a color pixel in the purple-fringed region with the monochrome average of red (R), green (G), and blue (B) intensity values of the color pixel.

9. The computer-implemented method of claim 8, wherein computing the monochrome average further comprises:

setting a red intensity value (R) of the monochrome pixel ($R_{Average}$) as:

$$R_{Average}=(\lambda_R R+(1-\lambda_R-\lambda_B)G+\lambda_B B);$$

setting a green intensity value (G) of the monochrome pixel ($G_{Average}$) as:

$$G_{Average}=(\lambda_R R+(1-\lambda_R-\lambda_B)G+\lambda_B B); \text{ and}$$

setting a blue intensity value (B) of the monochrome pixel ($B_{Average}$) as:

$$B_{Average}=(\lambda_R R+(1-\lambda_R-\lambda_B)G+\lambda_B B);$$

wherein $\lambda_R$ and $\lambda_B$ are numbers between 0 and 1.

10. The computer-implemented method of claim 1, wherein automatically correcting the purple fringing further comprises replacing a color pixel in the purple-fringed region with a pixel having its red (R) and blue (B) intensity values set using a green intensity value (G), such that:

$$R_{Replacement}=\beta_R R+(1-\beta_R)G; \text{ and}$$

$$B_{Replacement}=\beta_B B+(1-\beta_B)G;$$

wherein $\beta_R$ and $\beta_B$ are numbers between 0 and 1.

11. A computer-readable storage medium having stored and encoded thereon computer-executable instructions for processing an image containing purple-fringing, comprising:

automatically detecting near-saturated regions in the image, wherein the near-saturated regions contain pixels that have intensity values greater than a saturation threshold, and wherein an intensity value ranges from 0, which is totally black, to 255, which is completely saturated;

automatically detecting regions in the image wherein each pixel contains blue and red intensity values that are substantially greater than a green intensity value and designing these regions as candidate regions;

determining which of the candidate regions are spatially adjacent any one or more of the near-saturated regions and designating these candidate regions as purple-fringed regions containing at least some of the purple-fringing; and automatically correcting the purple-fringed regions by replacing pixels in the purple-fringed regions with at least some fully monochrome pixels by performing monochrome feathering of pixels in the purple-fringed regions such that there is a gradual transition and blending in the purple-fringed regions when going from purely monochrome pixels to purely color pixels.

12. The computer-readable storage medium of claim 11, further comprising detecting candidate regions in the image when both of the following conditions are met:

$$(B-R)>25; \quad \text{(a)}$$

and $$(B-C)>25, \quad \text{(b)}$$

wherein R is a red intensity value, C is a green intensity value, and B is a blue intensity value, for each pixel within the candidate regions.

13. The computer-readable storage medium of claim 11, wherein performing monochrome feathering further comprises:

defining an original monochrome region near a center of the purple-fringed region, wherein the original monochrome region contains purely monochrome pixels;

increasing a boundary of the original monochrome region by one pixel to obtain an augmented monochrome region;

modifying each added boundary pixel by blending the added boundary pixel's average intensity value with its original intensity values; and continuing to increase the boundary of the augmented monochrome region until the boundary contains purely color pixels.

14. The computer-readable storage medium of claim 11, further comprising:

selecting one of the near-saturated regions;

changing a boundary of the selected near-saturated region;

determining which of the candidate regions are adjacent the selected near-saturated region and designating this as the selected candidate region;

determining an intersection region of the selected near-saturated region and the selected candidate region;

designating the intersection region as a purple-fringed region; and repeating the above process for any remaining near-saturated regions.

15. A computer-implemented process for removing purple-fringing from a high-resolution image, comprising:

using the computer to perform the following:

automatically detecting near-saturated regions in the high-resolution image by determining that each pixel in the near-saturated region is greater than or equal to a saturation threshold;

automatically detecting candidate regions in the high-resolution image by determining that each pixel in the candidate regions have blue and red intensity values that are considerably larger than a green intensity value;

establishing that at least one of the candidate regions is adjacent at least one of the near-saturated regions, and designating this a purple-fringed region containing purple-fringing; and automatically replacing at least some original pixels in the purple-fringed region with corrected pixels having completely monochrome values, wherein replacing an original pixel further comprises replacing a red (R), green (G), and blue (B) intensity values of the original pixel with intensity values of a corrected pixel, wherein a red intensity value of the corrected pixel is given by:

$$R_{Corrected} = \beta_R R + (1-\beta_R)G;$$

and wherein a blue intensity value of the corrected pixel is given by:

$$B_{Corrected} = \beta_B B + (1-\beta_B)G;$$

and wherein $\beta_R$ and $\beta_B$ are numbers between 0 and 1.

16. The computer-implemented process as set forth in claim 15, further comprising:

computing a red intensity value of each of the corrected pixels ($R_{Average}$) as:

$$R_{Average} = (\lambda_R R + (1-\lambda_R-\lambda_B)G + \lambda_B B);$$

computing a green intensity value of each of the corrected pixels ($G_{Average}$) as:

$$G_{Average} = (\lambda_R R + (1-\lambda_R-\lambda_B)G + \lambda_B B); \text{ and}$$

computing a blue intensity value of each of the corrected pixels ($B_{Average}$) as:

$$B_{Average} = (\lambda_R R + (1-\lambda_R\lambda_B)G + \lambda_B B);$$

wherein $\lambda_R$ and $\lambda_B$ are numbers between 0 and 1, and wherein R, G, and B are the red, green, and blue intensity values of the original pixels being replaced.

17. The computer-implemented process as set forth in claim 15, further comprising replacing red (R), green (G), and blue (B) intensity values of an original pixel with intensity values of a corrected, feathered pixel given by the equations:

$$R_{Feathered} = ((N-L)I + LR)/N;$$

$$G_{Feathered} = ((N-L)I + LG)/N; \text{ and}$$

$$B_{Feathered} = ((N-L)I - LB)/N;$$

wherein I is a weighted average intensity, I, defined as $I=(\lambda_R R + (1-\lambda_R-\lambda_B)G + \lambda_B B)$, L is a distance away from a completely monochrome pixel, N is a number of pixels over which it takes to go from a completely monochrome pixel to a completely color pixel, and $\lambda_R$ and $\lambda_B$ are numbers between 0 and 1.

* * * * *